3,303,398
MAGNETIZER-DEMAGNETIZER
Gerald T. Barta, John R. Miskell, Phillip M. Jonas, and Thomas O. Quinn, Valparaiso, Ind., assignors to Indiana General Corporation, Valparaiso, Ind., a corporation of Indiana
Filed Aug. 1, 1963, Ser. No. 299,420
13 Claims. (Cl. 317—157.5)

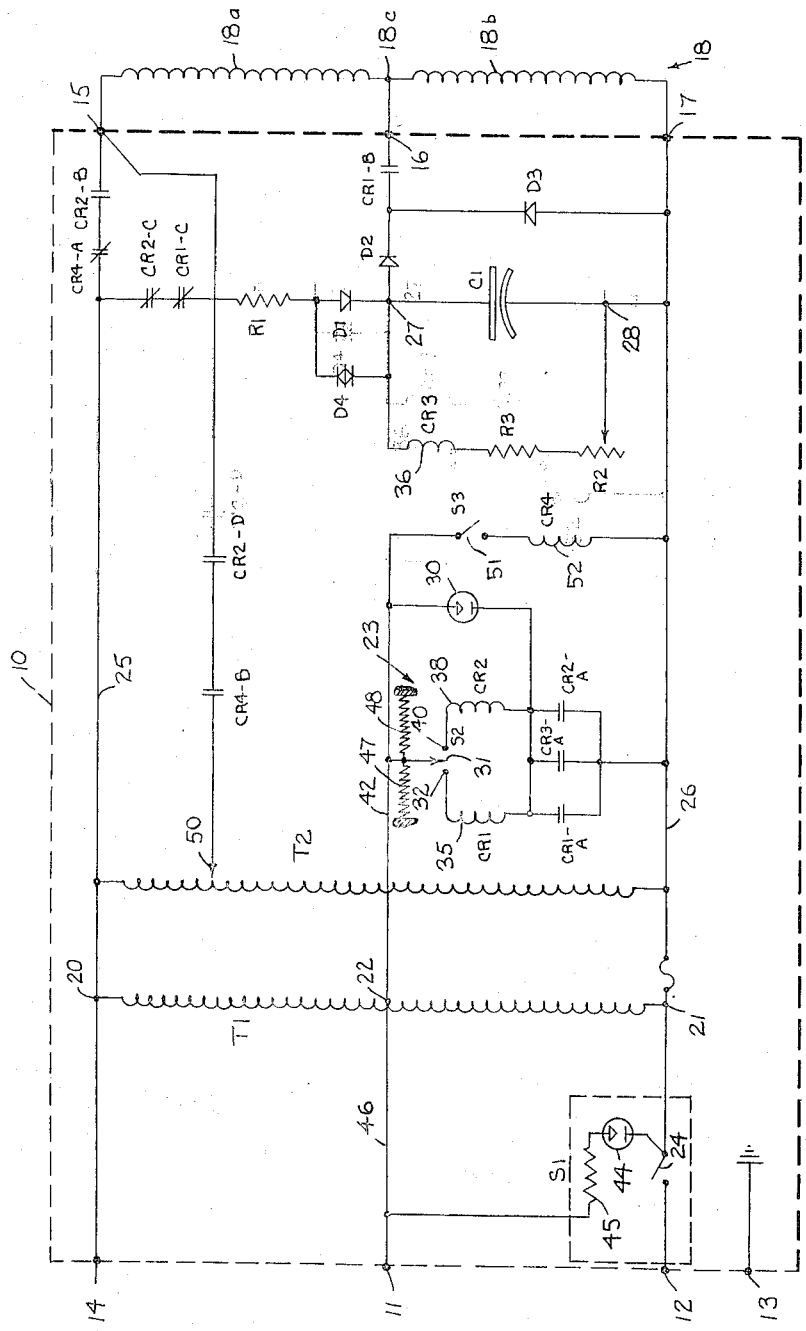

This invention relates to a permanent magnet processing system and particularly to a magnetizing-demagnitizing electric circuit for selectively supplying unidirectional current pulses of high peak value and alternating polarity electric current to a magnetizing coil for magnetizing the demagnetizing or stabilizing permanent magnet parts, respectively.

Certain configurations of "Alnico" or "Indox" magnetic material, for example, must be magnetized by unidirectional current pulses of high peak value. These same or similar magnet configurations may require exposure to an alternating polarity magnetic field for demagnetizing or stabilizing thereof during the course of manufacturing operations at a given plant. As is well known, stabilization is a process whereby a permanent magnet is demagnetized a small fixed amount, as for example 10%, thereby significantly increasing its long term ability to hold its magnetism. For further information on stabilization, reference may be made to numerous sources, as "Permanent Magnets and Magnetism" by D. Hadfield, John Wiley and Sons, New York, 1962, pages 439–441; "Permanent Magnets and Their Application," by Rollin J. Parker and Robert J. Studders, John Wiley and Sons, New York, 1962, pages 320–365; and "Applied Magnetics," volume 7, No. 1, a trade publication of Indiana Steel Products Co. (now Indiana General Corporation), copyright 1959, pages 2–13.

It is therefore an important object of the present invention to provide a compact and economical unit for use by manufacturers in the processing of permanent magnet components of their products.

It is another important object of the present invention to provide a portable magnetizer-demagnetizer unit for selectively magnetizing and demagnetizing permanent magnet components in connection with manufacturing operations.

It is still another object of the present invention to provide a single portable unit for processing permanent magnets which is capable of carrying out two or more functions such as magnetizing, demagnetizing and stabilizing.

It is another and further object of the present invention to provide a magnetizing apparatus of the capacitor discharge type which prevents a magnetizing operation until the capacitor means is fully charged.

It is a further important object of the present invention to provide a magnetizing-demagnetizing system for selectively supplying unidirectional magnetizing current pulses of high peak value and alternating current to a single magnetizing coil assembly.

Other objects, features and advantages of the present invention will be apparent from the following detailed description taken in connection with the accompanying drawings in which:

The single figure is a schematic diagram of a preferred electric circiut for the system of the present invention.

Referring to the drawings, the reference numeral 10 designates a cabinet for housing a magnetizing-demagnetizing circuit as a portable unit. The cabinet is provided with suitable means for receiving alternating electric power from a commercial supply. By way of example, terminals 11, 12 and 13 of the cabinet 10 may be connected to a 110 volt three wire grounded electric supply so that 110 volts of commercial frequency is applied between terminals 11 and 12 and terminal 13 which is electrically connected with the metal cabinet 10 is grounded. A further terminal 14 may be provided where a 220 volt electric supply is to be utilized. The illustrated unit is designed for frequencies in the range from 50 to 60 cycles per second.

In the illustrated embodiment three output terminals 15, 16 and 17 are indicated for connection to a unitary magnetizing coil assembly 18 including winding sections 18a and 18b having a common point as indicated at 18c. The magnetizing coil assembly 18 may be especially designed for the particular application with the winding section 18b in the illustrated embodiment being designed to provide the required magnetizing magnetic field pulse and the winding sections 18a and 18b in series being designed to provide the required amplitude and configuration of alternating current magnetic field.

It may be noted that winding assembly 18 may be included in the cabinet 10 and supplied as a unit therewith rather than being a separate external item.

In the preferred circuit, an auto transformer T1 is provided having an input section across terminals 11 and 12 for providing an output voltage between terminals 20 and 21 thereof of 220 volts. In this case, of course, terminal 14 is left unconnected. Alternatively, it will be apparent that a voltage of 220 volts may be supplied to terminals 12 and 14 and terminal 11 left unconnected. In this case, a voltage of 110 volts will be provided between terminals 21 and 22 of the auto transformer T1 to supply voltage to a control circuit indicated generally by the reference numeral 23. A switch S1 includes a movable contact 24 in series between terminals 12 and 21 for controlling the supply of voltage to the transformer T1 whether such voltage is supplied between terminals 11 and 12 or between terminals 12 and 14. A pilot light 44 of switch S1 is in series with a current limiting resistor 45 and contact 24 between line 46 and terminal 12 so that when voltage is applied to terminals 11 and 12 or 12 and 14, and contact 24 is closed, the pilot light 44 will be energized.

In the illustrated embodiment, a capacitor C1 is provided for supplying a unidirectional current pulse of high peak value to the winding section 18b so as to carry out a magnetizing operation. The charging circuit for capacitor C1 is as follows:

From terminal 20 via line 25, normally closed contacts CR2–C and CR1–C in series, resistor R1, diode D1, capacitor C1 and line 26 to terminal 21 of transformer T1.

The energizing coil 36 of a direct current relay CR3 is in series with a fixed resistor R3 and a variable resistor R2 to provide a series circuit connected across terminals 27 and 28 of capacitor means C1.

With relays CR1 and CR2 in control circuit 23 deenergized, the current flowing through resistor R1 and diode D1 during charging of capacitance means C1 partly flows to the capacitance means and partly flows through the series circuit including the actuating coil 36 of relay C3. As the charge on the capacitance C1 builds up, more and more current flows through the series circuit including the actuating coil of relay CR3. The relay CR3 is designed to operate at a predetermined current level corresponding to a voltage across the capacitance means of a desired value such as 265 volts. For a given relay CR3, the value of voltage across the capacitance at which the relay is operated may be adjusted by adjustment of the resistance value of variable resistor R2.

When the voltage across capacitance means C1 reaches the desired value, relay CR3 is operated closing its normally open contacts CR3–A to energize a pilot light indicated at 30 of the control circuit 23. The pilot light 30 indicates that the circuit is ready for a magnetizing or demagnetizing operation as desired.

If a magnetizing operation is desired, the permanent magnet part to be magnetized is placed in the winding assembly 18, for example by means of a suitable manually operated fixture, and the switch S2 moved to its left position is viewed in the drawing establishing continuity from terminal 22 of transformer T1 through line 42, movable contact 31 and stationary contact 32 of switch S2, through the energizing coil 35 of alternating current relay CR1, through contacts CR3–A of relay CR3 and via line 26 to terminal 21 of transformer T1. Operation of relay CR1 closes normally open contacts CR1–A and CR1–B of relay CR1 and opens normally closed contacts CR1–C of relay CR1. Contacts CR1–C thus open the charging circuit and contacts CR1–B close a capacitor discharge circuit extending from terminal 27 of capacitor C1 through diode D2, contacts CR1–B, terminal 16, terminal 18c, winding section 18b and terminal 17 to terminal 28 of capacitance C1. A current pulse of high amplitude is thus established in the winding section 18b to provide a pulse type magnetizing field of high peak value for magnetizing the component associated with the winding assembly 18.

The movable contact 31 of switch S2 is preferably resiliently biased toward its central open position as indicated diagrammatically by opposed tension springs 47 and 48. By this means, release of switch S2 by the operator will allow contacts 31 and 32 to open. In order to reestablish the charging circuit for capicator C1 and to open the capacitor discharge circuit, it is necessary to allow switch S2 to return to its open condition indicated in the drawing. With switch S2 in its open condition, energizing coil 35 of relay CR1 is deenergized to close normally closed contacts CR1–C and to open normally open contacts CR1–B. Until switch S2 is shifted to its open position, the actuating coil 35 is maintained energized through a holding circuit extending through normally open contacts CR1–A even though relay CR3 is deenergized opening contacts CR3–A.

As soon as capacitor C1 is again charged to the required value and relay CR3 actuated by means of its actuating coil 36, pilot light 30 is again energized, and a further magnetizing cycle may be initiated. Alternatively, the system may be placed in condition for a demagnetizing operation by shifting switch S2 from its open condition to a right hand position wherein an energizing circuit for relay coil 38 of relay CR2 is completed from terminal 22 of transformer T1 through line 42, movable contact 31 and fixed contact 40 of switch S2, actuating coil 38 of relay CR2, contacts CR3–A and line 26 to terminal 21 of transformer T1.

Energization of relay CR2 closes normally open contacts CR2–A and CR2–B and opens normally closed contacts CR2–C of relay CR2. Contacts CR2–A provide a holding circuit for relay CR2 and contacts CR2–C open the charging circuit for capacitor C1 allowing the capacitor to partially discharge at a slow rate through its parallel circuit including resistors R2 and R3 and actuating coil 36 of relay CR3. Closure of contacts CR2–B completes a demagnetizing circuit which extends from terminal 20 of transformer T1 via line 25, contacts CR2–B, terminal 15, winding sections 18a and 18b in series, terminal 17, and line 26 to terminal 21 of transformer T1.

An alternating current is thus established in the winding assembly 18. If the alternating current is of relatively high amplitude, it will be necessary to limit the duration of the demagnetizing cycle. During the demagnetizing cycle, a permanent magnet unit which has been magnetized may be moved from a relatively intense portion of the alternating magnetic field to a position out of the magnetic field so as to completely demagnetize the part. A suitable fixture may be provided together with suitable stops and the like for carrying out the desired movement of the permanent magnet parts.

When the switch S2 is returned to its open position, capacitor C1 is again substantially fully charged as in the case of the magnetizing cycle.

It will thus be apparent that the system provides for alternate magnetizing and demagnetizing operation or a series of magnetizing or demagnetizing operations at the will of the operator. The operation of the circuit may be controlled automatically in response to the position of a work piece fixture, for example. Thus, with selector switch S2 in the left or magnetizing position, a further switch in series between contact 32 and coil 35 may be shifted from open to closed position automatically in response to movement of a fixture to insert a magnet part into the winding assembly 18. These contacts may be automatically reopened after a predetermined time interval corresponding to the time required for delivery of a magnetizing pulse from capacitor C1.

Similarly, with selector S2 in its right hand demagnetizing position, normally open contacts in series between contact 40 and coil 38 may be automatically closed in response to a fixture moving to a predetermined position with a permanent magnet component at a desired position within the winding assembly 18, the contacts automatically reopening in response to travel of the fixture to a second limit position with the permanent magnet effectively outside of the field of the winding assembly 18.

Element D3 is a surge suppressor for diode D2 and element D4 is a surge suppressor for diode D1.

By way of example, in one commercial embodiment of the system of the present invention winding assembly 18 was within the cabinet 10 and part of a unitary portable magnetizer-demagnetizer device. The winding assembly of the device was formed by first winding on a coil form 318 turns of number 10 square cross section wire with 53 turns per layer and then winding on top of the 318 turns on the same coil form 1200 turns of number 15 circular cross section wire with 98 turns per layer. The 1200 turns then served as section 18a of the winding assembly and the 318 turns served as winding section 18b. The overall length of the coil assembly was 6 inches and the diameter of the core of the coil form was approximately 1 and ¾ inches. A cabinet for this system had overall dimensions of approximately 11 inches by 17 inches by 9½ inches. The capacitor means comprised a capacitor bank of three units each having a capacity of 300 microfarads and a rated direct current voltage of 450 volts—polarized. The transformer T1 was rated at 1000 watts. Diode D1 was rated for 1 ampere continuous current and 3 amperes recurrent peak current and for a peak inverse voltage of 600 volts, while diode D2 was rated at 100 amperes continuous current and 1600 amperes maximum surge current, and 525 volts peak inverse voltage. The transformer was rated 220/110 volts at 60 cycles per second. The electric supply source for the unit was either 110 volts or 220 volts and the power source had a capacity of at least 1800 watts.

As indicated, the magnetizer-demagnetizer unit may be provided with means for facilitating a stabilizing operation comprising a variable auto transformer T2 having a movable contact 50 for supplying any desired alternating current voltage to the winding assembly 18.

To provide a desired level of stabilizing magnetic field, switch S3 is actuated to close its contact 51 and complete an energizing circuit for energizing coil 52 of a relay CR4. The energizing circuit extends from terminal 22 of transformer T1 via line 42, movable contact 51, energizing coil 52 of relay CR4 and line 26 to terminal 21 of transformer T1. In the illustrated embodiment, transformer T2 is not connected with line 42.

Energization of relay CR4 opens normally closed contacts CR4–A and closes normally open contacts CR4–B. Thus the normal demagnetizing circuit including conductor 25 and leading to terminal 15 is open. Selector switch S2 may still, however, select the magnetizing function by movement of selector S2 to the left. If, however, a stabilizing function is desired, selector switch S2 is moved to the right to energize coil 38 of relay CR2 opening contacts CR2–C to open the capacitor charging circuit and closing contacts CR2–D so as to supply alternating current from transformer T2 via movable contact 50 to the terminal 15 of the winding assembly 18. The movable contact 50 may now be adjusted until the desired stabilizing magnetic field level is attained at the winding assembly 18.

When a stabilizing operation has been completed, selector switch S2 is released to allow its return by spring means 47 to the central open position deenergizing relay CR2 and thus again completing the capacitance charging circuit by closure of normally closed contacts CR2–C. If only stabilizing or magnetizing functions are desired, selector switch S3 may remain closed and relay CR4 energized. With capacitor C1 fully charged as indicated by energization of relay CR3, selector switch S2 may now be moved to its left hand position to energize relay CR1 and close contacts CR1–B to initiate a magnetizing operation. Thus, with selector S3 closed, magnetizing and stabilizing operations may be carried out selectively at the will of the operator.

Summary of operation

In placing the illustrated embodiment in operation, a supply of a relatively low voltage would be connected to terminals 11, 12 and 13 of cabinet 10, while a supply of a relatively higher voltage would be connected to terminals 12, 13 and 14 of cabinet 10. In the illustrated embodiment, a winding assembly 18 is connected to terminals 15, 16 and 17 of the cabinet so as to serve as a source of magnetizing and demagnetizing magnetic fields. In the illustrated case, winding section 18b is utilized for magnetizing and is associated in a capacitor discharge circuit with capacitor bank C1 under the control of relay CR1. Winding sections 18a and 18b in series provide the alternating polarity demagnetizing or stabilizing field.

Relay CR3 senses when capacitor bank C1 is fully charged and closes contact CR3–A to energize pilot light 30 to indicate that the capacitor is charged. Selector switch S2 is then placed in its left hand position if a magnetizing operation is desired and contacts CR1–A maintain relay CR1 energized and prevent recharging of capacitor C1 until the switch S2 is allowed to return to its open position.

When switch S2 is moved to its open position and pilot light 30 is again energized, the switch S2 may be moved to its right hand position for energizing relay CR2 to supply alternating current to the winding sections 18a and 18b in series for carrying out a demagnetizing operation.

If a stabilizing operation is desired, selector switch S3 is actuated to close its movable contact 51 energizing relay CR4 and opening contacts CR4–A and closing contacts CR4–B. With relay CR3 energized, switch S2 may now be moved to its right hand position to energize relay CR2 and close contacts CR2–D to supply alternating current to the winding assembly 18 at a voltage selected by movable contact 50 of transformer T2. When selector switch S2 is released, spring 47 returns the selector switch to its center open condition deenergizing relay CR2 and opening contacts CR3–D to interrupt the stabilizing circuit.

When capacitor C1 is again substantially fully charged as a result of closure of contacts CR2–C, relay CR3 is energized, and selector switch S2 may be moved to its left hand position to carry out a magnetizing operation even though selector switch S3 remains in its closed condition. Thus, the magnetizing operation may be selected by switch S2 whether selector switch S3 is in open or closed condition.

The winding assembly 18 may have the winding section 18b provided by a helical coil having a number of layers, and the winding section 18a may comprise a helical coil wound on the winding section 18b and generally coextensive in axial extent therewith and formed in a number of layers radially outwardly of the winding section 18b.

The transformer T1 may be omitted if transformer T2 is provided with a center tap connected to line 42.

The illustrated embodiment provides a compact yet versatile piece of equipment which is highly useful in manufacturing operations involving permanent magnet components.

It will be apparent that modifications and variations may be effected without departing from the scope of the novel concepts of the present invention.

We claim as our invention:

1. A magnetizer-demagnetizer system comprising capacitance means having a capacitance discharge circuit for connection to a magnetizing winding, a capacitance charging circuit for supplying unidirectional current to said capacitance means, a demagnetizing circuit for supplying a demagnetizing current to a demagnetizing winding, a magnetizing relay having normally open contacts in series in said capacitance discharge circuit, demagnetizing relay having normally open contacts in series in said demagnetizing circuit, said magnetizing and demagnetizing relays having respective magnetizing and demagnetizing relay energizing circuits for energization of the respective relays to shift the normally open contacts thereof to closed condition, at least said magnetizing relay energizing circuit being in series with a normally open contact of a control relay connected across said capacitance means, said control relay requiring a predetermined voltage across said capacitor means before being energized to shift its normally open contact to a closed condition, selector switch means having contacts in said magnetizing and demagnetizing relay energizing circuits and in a first condition having its contacts open to interrupt both the magnetizing and demagnetizing relay energizaing circuits, in a second condition closing its contacts in the magnetizing relay energizing circuit to close the capacitance discharge circuit provided said control relay is energized to supply a magnetizing pulse from the capacitance means to the magnetizing winding and in a third condition closing its contacts in the demagnetizing relay energizing circuit to close the demagnetizing circuit for delivery of demagnetizing current to said demagnetizing winding, and means controlling electrical continuity of said capacitance charging circuit and responsive to the first condition of said selector switch means to complete electrical continuity of said capacitance charging circuit to charge said capacitance means.

2. A magnetizer-demagnetizer system comprising capacitance means having a capacitance discharge circuit for connection to a magnetizing winding, a capacitance charging circuit for supplying unidirectional current to said capacitance means, a demagnetizing circuit for supplying alternating current to a demagnetizing winding, control relay means connected across said capacitance means and having normally open control contacts for closure in response to a predetermined voltage across said capacitance means, a magnetizing relay having normally closed contacts in series in said capacitance charging circuit and normally open contacts in series in said capacitance discharge circuit, a demagnetizing relay having normally closed contacts in series in said capacitance charging circuit and having normally open contacts in series in said demagnetizing circuit, said magnetizing and demagnetizing relays having respective magnetizing and demagnetizing relay energizing circuits including respectively further normally open holding contacts of the magnetizing and demagnetizing relays and including said normally open control contacts of said control relay means in parallel with said normally open holding contacts, and selector switch means having contacts in said magnetizing and demagnetizing relay energizing circuits and in one condition having its contacts in open condition to interrupt both the magnetizing and demagnetizing relay energizing circuits to provide for charging of the capacitance means through the normally closed contacts of the magnetizing and demagnetizing relays and in a second condition closing its contacts in the magnetizing relay energizing circuit to open the capacitance charging circuit and close the capacitance discharge circuit to supply a magnetizing pulse from the capacitance means to the magnetizing winding and in a third condition closing its contacts in the demagnetizing relay energizing circuit to open the capacitance charging circuit and to close the demagnetizing circuit for delivery of alternating current to the demagnetizing winding.

3. A magnetizer-demagnetizer system comprising a winding assembly having first and second winding sections wound one on top of the other, capacitance means having a capacitance discharge circuit connected to said first winding section of said winding assembly, a capacitance charging circuit for supplying unidirectional current to said capacitance means, a demagnetizing circuit connected to said first and second winding sections of said winding assembly in series for supplying alternating current thereto, a magnetizing relay having normally closed contacts in series in said capacitor charging circuit and normally open contacts in series in said capacitance discharge circuit, a demagnetizing relay having normally open contacts in series in said demagnetizing circuit, said magnetizing and demagnetizing relays having respective magnetizing and demagnetizing relay energizing circuits, at least said magnetizing relay energizing circuit being in series with a normally open contact of a control relay connected across said capacitance means, said control relay requiring a predetermined voltage across said capacitor means before being energized to shift its normally open contact to a closed condition, and selector switch means having contacts in said magnetizing and demagnetizing relay energizing circuits and in one condition having its contacts in open condition to provide for charging of the capacitance means through the normally closed contacts of the magnetizing relay and in a second condition closing its contacts in the magnetizing relay energizing circuit to open the capacitance charging circuit and to close the capacitance discharge circuit provided said control relay is energized, to supply a magnetizing pulse from the capacitance means to the first section of said winding assembly and in a third condition closing its contacts in the demagnetizing relay energizing circuit to close the demagnetizing circuit for delivery of alternating current to said first and second winding sections in series.

4. A magnetizer-demagnetizer system comprising capacitance means having a capacitance discharge circuit for connection to a magnetizing winding, a capacitance charging circuit for supplying unidirectional current to said capacitance means, a demagnetizing circuit for supplying alternating current to a demagnetizing winding, a magnetizing relay having normally closed contacts in series in said capacitance charging circuit and having normally open contacts in series in said capacitance discharge circuit, a demagnetizing relay having normally closed contacts in series in said capacitance charging circuit and having normally open contacts in series in said demagnetizing circuit, said magnetizing and demagnetizing relays having respective magnetizing and demagnetizing relay energizing circuits for energization of the respective relays to shift the normally closed and normally open contacts thereof to open and closed condition respectively, at least said magnetizing relay energizing circuit being in series with a normally open contact of a control relay connected across said capacitance means, said control relay requiring a predetermined voltage across said capacitor means before being energized to shift its normally open contact to a closed condition, a variable resistor in series with said control relay to change the predetermined voltage needed across said capacitance means to energize said control relay, and selector switch means having contacts in said magnetizing and demagnetizing relay energizing circuits and in one condition having its contacts open to interrupt both the magnetizing and demagnetizing energizing circuits to provide for charging of the capacitance means through the normally closed contacts of the magnetizing and demagnetizing relays and in a second condition closing its contacts in the magnetizing relay energizing circuit to open the capacitance charging circuit and to close the capacitance discharge circuit provided said control relay is energized to supply a magnetizing pulse from the capacitance means to the magnetizing winding and in third condition closing its contacts in the demagnetizing relay energizing circuit to open the capacitance charging circuit and to close the demagnetizing circuit for delivery of alternating current to said demagnetizing winding.

5. A magnetizer system comprising capacitance means having a capacitance discharge circuit for connection to a magnetizing winding, a capacitance charging circuit for supplying unidirectional current to said capacitance means, a magnetizing relay having normally open contacts in series in said capacitance discharge circuit, said magnetizing relay having a magnetizing relay energizing circuit for energization of the magnetizing relay to shift the normally open contacts thereof to closed condition, selector switch means having contacts in said magnetizing relay energizing circuit and in a first condition having its contacts open to interrupt the magnetizing relay energizing circuit and in a second condition closing its contacts in the magnetizing relay energizing circuit to close the capacitance discharge circuit to supply a magnetizing pulse from the capacitance means to the magnetizing winding, means controlling electrical continuity of said capacitance charging circuit and responsive to the first condition of said selector switch means to complete electrical continuity of said capacitance charging circuit to charge said capacitance means, and means responsive to the voltage across said capacitance means and controlling continuity of said magnetizing relay circuit for maintaining said magnetizing relay circuit in an open circuit condition in spite of actuation of said selector switch means to said second condition thereof until said capacitance means is charged to a predetermined voltage.

6. A magnetizer-demagnetizer system comprising a magnetizing circuit including discharge means for connection to a magnetizing winding to supply unidirectional magnetizing current thereto, a source means for recharging said discharge means after every magnetizing operation, a demagnetizing circuit for supplying demagnetizing current to a demagnetizing winding, a magnetizing relay having normally open contacts in series in said magnetizing circuit, a demagnetizing relay having normally open contacts in series in said demagnetizing circuit, said magnetizing and demagnetizing relays having respective magnetizing and demagnetizing relay energizing circuits for energization of the respective relays to shift the normally open contacts thereof to closed condition, manually operable selector switch means having contacts in said magnetizing and demagnetizing relay energizing circuits and in a first condition having its contacts open to interrupt both the magnetizing and demagnetizing relay energizing circuits, in a second condition closing its contacts in the magnetizing relay energizing circuit to close the magnetizing circuit to supply unidirectional magnetizing current to the magnetizing winding and in a third condition closing its contacts in the demagnetizing relay energizing circuit to close the demagnetizing circuit for delivery of demagnetizing current to said demagnetizing winding, means resiliently urging said selector switch means to said first condition to automatically open both the magnetizing and demagnetizing relay energizing circuits upon release of said selector switch means after being actuated to its second or third condition, and means preventing said selector switch means from activating said magnetizing circuit until said discharge means is recharged by a predetermined amount.

7. A magnetizer-demagnetizer unit for use in magnetizing and demagnetizing permanent magnets comprising a magnetizing circuit for supplying magnetizing current from discharge means to a magnetizing winding, source means for recharging said discharge means after every magnetizing operation, a demagnetizing circuit for supplying demagnetizing current to a demagnetizing winding, selector switch means controlling said magnetizing and demagnetizing circuits and in one condition activating said magnetizing circuit and in another condition activating said demagnetizing circuit, and means preventing said selector switch means from activating said magnetizing circuit until said discharge means is recharged by a predetermined amount.

8. A magnetizer-demagnetizer unit for use in magetizing and demagnetizing permanent magnets comprising capacitance means having a capacitance discharge circuit for connection to a magnetizing winding, a capacitance charging circuit for supplying unidirectional charging current to said capacitance means, a demagnetizing circuit for supplying demagnetizing current to a demagnetizing winding, selector switch means controlling said capacitance discharge circuit and said demagnetizing circuit and in one condition activating said capacitance discharge circuit to supply a magnetizing pulse from said capacitance means to the magnetizing winding and in another condition supplying demagnetizing current to said demagnetizing winding, and means responsive to the voltage across said capacitance means for maintaining said one condition of said selector switch in an open circuit condition until said capacitance means is charged to a predetermined voltage, thereby preventing a magnetizing operation in spite of actuation of said selector switch means until a predetermined charge is accumulated in said capacitor means.

9. A magnetizer-demagnetizer unit for use in magnetizing and demagnetizing permanent magnets comprising a magnetizing circuit for supplying magnetizing current from discharge means to a magnetizing winding, source means for recharging said discharge means after every magnetizing operation, a demagnetizing circuit for supplying demagnetizing current to a demagnetizing winding, selector switch means controlling said magnetizing and demagnetizing circuits and in a first position activating said magnetizing circuit, in a second position deactivating both said magnetizing and demagnetizing circuits and in a third position activating said demagnetizing circuit, resilient means for continuously urging said seselector switch means to said second position while accommodating manual actuation of said selector switch means to said first and third positions and for automatically returning said selector switch means to said second position upon release thereof after actuation to said first and third positions, and means preventing said selector switch means from activating said magnetizing circuit until said discharge means is recharged by a predetermined amount.

10. A permanent magnet processing unit comprising a winding assembly having magnetizing terminals for receiving a magnetizing voltage and having demagnetizing terminals for receiving a demagnetizing voltage effective respectively to magnetize and demagnetize ceramic permanent magnet components, a magnetizing circuit having discharge means for connection with the magnetizing terminals of said winding assembly to supply a magnetizing current thereto, source means for recharging said discharge means after every magnetizing operation, a demagnetizing circuit for connection to the demagnetizing terminals of said winding assembly for supplying a demagnetizing current thereto, selector switch means controlling said magnetizing and demagnetizing circuits and in one condition activating said magnetizing circuit and in another condition activating said demagnetizing circuit, means preventing said selector switch means from activating said magnetizing circuit until said discharge means is recharged by a predetermined amount, and adjustable means for varying the predetermined amount said discharge means must be recharged before said selector switch means can activate said magnetizing circuit.

11. A permanent magnet stabilizing and magnetizing system comprising a magnetizing circuit for supplying magnetizing current from discharge means to a magnetizing winding, source means for recharging said discharge means after every magnetizing operation, variable transformer means having an output for supplying a variable alternating current stabilizing voltage, a stabilizing circuit for coupling to a stabilizing winding and connected to the output of said transformer means, switch means controlling continuity of said magnetizing circuit and said stabilizing circuit and selectively operable to activate said magnetizing circuit to supply to magnetizing current to the magnetizing winding and to activate the stabilizing circuit to supply a variable alternating current stabilizing voltage to the stabilizing winding under the control of said variable transformer means, and means preventing said selector switch means from activating said magnetizing circuit until said discharge means is recharged by a predetermined amount.

12. A permanent magnet processing system comprising a winding assembly having magnetizing terminals and demagnetizing terminals, a magnetizing circuit for connection with said magnetizing terminals of said winding assembly for supplying a magnetizing current from discharge means to the winding assembly, source means for recharging said discharge means after every magnetizing operation, a demagnetizing circuit for connection with the demagnetizing terminals of the winding assembly for supplying a demagnetizing current to the winding assembly, a stabilizing circuit for connection to the demagnetizing terminals of the winding assembly for supplying an adjustable alternating current stabilizing voltage to the winding assembly, first selector switch means controlling said stabilizing and demagnetizing circuits and having a first condition providing for activation of said stabilizing circuit and having a second condition providing for activation of said demagnetizing circuit, second selector means having a first condition for activating said magnetizing circuit regardless of the condition of said first selector switch means and having a second condition for activating said stabilizer circuit in the first condition of the first selector means and for activating said demagnetizing circuit in the second condition of said first selector means, and means preventing said selector switch means from activating said magnetizing circuit until said discharge means is recharged by a predetermined amount.

13. A permanent magnet processing assembly comprising transformer means having first, second and third input terminals for selectively receiving a first relatively high voltage between said first and third terminals and a second relatively low voltage between said second and third terminals and having first, second and third output terminals and a fourth variable voltage output terminal for supplying a relatively high fixed voltage between said first and third output terminals, a relatively lower voltage between said second and third output terminals and a variable voltage between said fourth terminals and said third terminal, a winding assembly having first, second and third terminals for receiving selectively a stabilizing and demagnetizing voltage across said first and third terminals and a magnetizing voltage across said second and third terminals, capacitance means having a capacitance discharge circuit for connection to said second and third terminals of said winding assembly, a capacitance charging circuit connected between said first and third output terminals of said transformer means for supplying unidirectional charging current to said capacitance means, a demagnetizing circuit for connecting said first and third output terminals of said transformer means with said first and third terminals of said winding assembly for supplying alternating current to the winding assembly, a stabilizing circuit for connecting the third and fourth terminals of the transformer means to the first and third terminals of the winding assembly for supplying an alternating stabilizing current to the winding assembly, first selector means controlling said demagnetizing and stabilizing circuits and in condition accommodating energization of said demagnetizing circuit and in a second condition accommodating energization of said stabilizing circuit, and second selector means controlling said capacitance discharge circuit, said demagnetizing circuit and said stabilizing circuit and operable in one condition to activate said capacitance discharge circuit regardless of the condition of said first selector means, in a second condition completing said capacitance charging circuit for charging of said capacitance means, and in a third condition providing for activation of said demagnetizing circuit with said first selector means in said first condition and providing for activation of said stabilizing circuit with said first selector means in said second condition, and means responsive to the voltage across said capacitance means for open circuiting said second selector means when in said one condition until said capacitance means is charged to a predetermined voltage.

References Cited by the Examiner
UNITED STATES PATENTS

| | | | |
|---|---|---|---|
| 2,138,864 | 12/1938 | Karasick | 317—157.5 |
| 2,427,750 | 9/1947 | Snyder | 317—157.5 X |
| 2,648,033 | 8/1953 | Hudson | 317—157.5 X |
| 2,996,863 | 8/1961 | Odell | 317—123 X |
| 3,035,219 | 5/1962 | Friedman | 320—27 X |

MILTON O. HIRSHFIELD, *Primary Examiner.*

LEE T. HIX, *Examiner.*